(12) United States Patent
Tang et al.

(10) Patent No.: US 11,010,799 B2
(45) Date of Patent: May 18, 2021

(54) GENERALIZED APPLICATION VIRTUALIZATION METHOD FOR BUSINESS USE ON THE WEB AND THE MINI SERVER USING THIS METHOD

(75) Inventors: Chang Bin Tang, Shanghai (CN); Fen Zhou, Shanghai (CN)

(73) Assignee: TRANSOFT (SHANGHAI) INC., Shanghai (CN)

( * ) Notice: Subject to any disclaimer, the term of this patent is extended or adjusted under 35 U.S.C. 154(b) by 855 days.

(21) Appl. No.: 11/830,493

(22) Filed: Jul. 30, 2007

(65) Prior Publication Data
US 2008/0183641 A1    Jul. 31, 2008

(30) Foreign Application Priority Data
Jan. 25, 2007  (CN) .......................... 200710036808.5

(51) Int. Cl.
*G06Q 30/00* (2012.01)
*G06Q 30/06* (2012.01)
*G06F 9/455* (2018.01)
*G06Q 30/02* (2012.01)

(52) U.S. Cl.
CPC ......... *G06Q 30/06* (2013.01); *G06F 9/45537* (2013.01); *G06Q 30/02* (2013.01); *G06Q 30/0284* (2013.01)

(58) Field of Classification Search
CPC ..... G06Q 30/0284; G06Q 30/02; G06Q 30/06
USPC .................................. 705/26, 27, 26.1, 27.1
See application file for complete search history.

(56) References Cited

U.S. PATENT DOCUMENTS

| | | | |
|---|---|---|---|
| 5,819,034 A * | 10/1998 | Joseph et al. | .................. 709/201 |
| 6,253,375 B1 * | 6/2001 | Gordon | .............. H04N 7/17336 |
| | | | 348/E7.073 |
| 6,314,572 B1 * | 11/2001 | LaRocca et al. | ................ 725/60 |
| 6,735,601 B1 | 5/2004 | Subrahmanyam | |
| 6,851,063 B1 * | 2/2005 | Boyle | ...................... H04K 1/02 |
| | | | 380/232 |
| 7,017,188 B1 | 3/2006 | Schmeidler et al. | |
| 7,073,189 B2 * | 7/2006 | McElhatten et al. | ........... 725/58 |

(Continued)

OTHER PUBLICATIONS

"Tools for a New Era," by Paul Arceneaux, Computer Technology Review, suppl. Storage Inc: 24-25. West World Publications, Inc. (Third Quarter 2002) (Year: 2002).*

(Continued)

*Primary Examiner* — Anne M Georgalas
(74) *Attorney, Agent, or Firm* — Occhiuti & Rohlicek LLP (57) ABSTRACT

A generalized application virtualization platform and method are provided for business use on the web and a mini server. The method includes: (1) Initializing, application monitoring, registration and login; (2) Accessing to a server via Access protocol from a client-side SOD (software on-demand) controller; (3) Content selecting via keyword search, with the selected contents provided by a content management protocol; (4) Choosing one of the available application virtualization methods according to bandwidth needed by the user and the resources consumed in a data center; (5) Binding of the executable software for the application virtualization method and the contents selected, and running the executable software; and (6) Metering and billing: Meter the start and end time of the execution of application virtualization method and calculate the billing.

14 Claims, 8 Drawing Sheets

(56) References Cited

U.S. PATENT DOCUMENTS

| | | | |
|---|---|---|---|
| 7,690,039 B2 | 3/2010 | Schmeidler et al. | |
| 7,707,641 B2 | 4/2010 | Schmeidler et al. | |
| 7,966,078 B2* | 6/2011 | Hoffberg | G05B 15/02 700/17 |
| 8,438,298 B2* | 5/2013 | Arai | G06F 8/65 709/203 |
| 2002/0054087 A1* | 5/2002 | Noll | H04N 21/4782 715/744 |
| 2003/0069924 A1* | 4/2003 | Peart | G06F 9/547 709/203 |
| 2004/0139024 A1* | 7/2004 | So | 705/51 |
| 2005/0234860 A1* | 10/2005 | Roever | G06F 21/10 |
| 2005/0240558 A1* | 10/2005 | Gil | G06F 16/972 |
| 2005/0278259 A1* | 12/2005 | Gunaseelan | G06Q 10/10 705/59 |
| 2007/0124416 A1* | 5/2007 | Casey et al. | 709/217 |
| 2007/0174429 A1* | 7/2007 | Mazzaferri | G06F 3/1415 709/218 |
| 2007/0271578 A1* | 11/2007 | Thenthiruperai et al. | 725/23 |
| 2008/0065507 A1* | 3/2008 | Morrison | G06Q 30/0613 705/26.3 |
| 2011/0126246 A1* | 5/2011 | Thomas | G06F 3/0481 725/93 |

OTHER PUBLICATIONS

"Evolving Objectives: Measuring the Value of Transformation." Cloud Strategy Brief. 2010 IT Process Institute.14 pages.

"IT Value Transformation Road Map: Vision, Value and Virtualization." Cloud Strategy Brief. 2010 IT Process Institute. 24 pages.

Cloud Computing Services with VMware Virtualization—Cloud Infrastructure Retrieved from http://www.vmware.com/solutions/cloud-computing/ on Nov. 5, 2010. 3 pages.

Microsoft Completes Acquisition of Softricity. News Press Release. Redmond, Washington Jul. 17, 2006 1 page.

VMWare and Cloud Computing: An Evoluatoinary Approach to an IT Revolution. 20 pages.

"Softricity® SoftGrid® 3.0: Under the Covers. Exploring the SoftGrid Platform", Nov. 2003. 28 pages.

"Softricity® SoftGrid® Media Edition Product Overview" Feb. 2004 9 pages.

"Configuration Guide: SoftGrid for Windows Desktops Client v2.0.5" Document No. sgforwd_cg/2.0.5 Nov. 2002 117 pages.

"MicroSoft SoftGrid® v4 Application Virtualization and Streaming" Feb. 2007.27 pages.

Microsoft Application Virtualization Onine Product Information. Retrieved from http://www.microsoft.com/systemcenter/appv/default.mspx on Nov. 5, 2010, 2 pages.

Application Virtualization Wikipedia entry http://en.wikipedia.org/wiki/Application_virtualization on Nov. 5, 2010. 3 pages.

Microsoft App-V Wikipedia entry http://en.wikipedia.org/wiki/Microsoft_Application_virtualization 5 pages.

Cerling et al. *Mastering Microsoft Virtualizaton* Part 2: Microsoft Application Virtualization (Chapters 7-9). Wiley Publishing. 2010. pages 255-279.

* cited by examiner

GENERALIZED APPLICATION VIRTUALIZATION METHOD FOR BUSINESS USE ON THE WEB AND THE MINI SERVER USING THIS METHOD

CROSS-REFERENCE TO RELATED APPLICATION

This application claims priority to Chinese patent application 200710036808.5, filed 25 Jan. 2007, the subject matter of which are hereby incorporated by reference in its entirety.

FIELD OF THE INVENTION

The invention involves a generalized application virtualization method for business use on the web and a mini server using this method. More particularly, the invention provides a network operator with a leasing platform for the web user to lease digital contents, including application software, game, anime, movie, music, courseware, etc. The operator manages these with the generalized application virtualization method for business use on the web and the mini server using this method.

THE PRIOR ART

For an ASP operator to lease digital contents on web, there are primarily 3 successful ways: one is to collect monthly fee for the movie-watching (the video on-demand, VOD) or game-playing (the game on-demand, GOD); the second one is to browser-based billing controlled by a server (browser/server, B/S); and the other one is client-based billing controlled by server (client/server, C/S), for example, network game. As for the first method, there is either no control over user pirated download, or massive code-embedding into individual applications or media players. In the second and third methods, it is necessary for individual applications to modify the code, whether at the client-side or the server-side.

With an application virtualization technique, one can then provide a unified leasing method to application software, game, and other media. There is no need to modify application code; no worry about incompatibility between player and media; and no chance of content piracy. The present invention uses a pre-processing sequencing method to package application software or game one-by-one. For media such as movie or music, package the specific player and the media together. (These sequenced software or medium packages are called content hereafter.) Then place the said contents at the server for users to stream, on-demand, to their virtual clients. At virtual clients, contents need not be installed, are piracy-free, can be used anywhere/anytime, and do not disturb Windows™ (hereinafter "Windows") registry and operating system files. This technique has already been provided by several vendors, although Microsoft™ (hereinafter "Microsoft") imbedded it into its operating system and made it the standard of the application virtualization method. However, Microsoft product, Soft-Grid, is matured in the intranet market only. In reality, SoftGrid™ (hereinafter "SoftGrid") has never been used for billing on the web. There are a few drawbacks to use SoftGrid as a foundation of the application virtualization method for contents leasing, described below:

(1) Maturity of the Microsoft product: In addition to delivery function, the security access and metering functions are still immature; To be specific, these are caused by the following reasons: (a) Currently, SoftGrid uses Windows Basic Authentication, which needs to work with Active Directory on the server side. Therefore, the IT operation is not simple. As for the Windows Domain Authentication, it is impossible for the consumers to be controlled from Windows domain of the server, so the authentication scheme is entirely unsuitable on the web. (b) Although the Microsoft Softricity™ (hereafter "Softricity") U.S. Pat. No. 7,017,188 mentions that the time information for metering need not be included in the streaming protocol, the Microsoft product SoftGrid currently uses setup and teardown commands of RTSP transmission protocol for metering. Metering is the foundation of billing. So, if billing can't separate from RTSP protocol and operate independently, the application virtualization method is still controlled by the Microsoft product. And it is not simple to use.

(2) The actual market situation: Microsoft product and patent are not all in consideration of the user who must handle a great deal of contents on web, such as content search and selection. In addition, they are also short of buffering mechanism in case of ASP operator who uses one central server to serve centralized contents for several companies or user groups.

(3) The monopolization of Microsoft: Merely taking Microsoft product as foundation may lose the opportunity of absorbing improved techniques from other companies, and even lose future "non-Windows (e.g. cell phone)" digital content leasing market.

SUMMARY OF THE INVENTION

The purpose of the invention is to provide a generalized application virtualization method for business use on the web. More particularly, the invention provides a network operator with a leasing platform for the web users to lease digital contents, including application software, game, anime, movie, music, courseware, etc. By abandoning the Microsoft Windows authentication method, the invention creates a mechanism to allow network operators to operate without Microsoft Active Directory on the web. As a result of adopting a metering method independent from the Microsoft streaming protocol, user billing is no longer monopolized by a single application virtualization technique. This new method can also imbed advertisement dynamically, remove the shortcoming of illegal game plug-in, and read game status files from the client cache. Meanwhile, the user has the ability to choose from a large amount of contents. A content server can also use a hierarchical tree structure to collect and manage massive contents. Moreover, because content delivery and running is now separated from Microsoft transmission protocol, the invention can take advantage of the improved application virtualization technique from any vendor who improves this technique (e.g. increasing transmission speed and decreasing delay). Finally, the invention also provides for a group or organization a content buffering mechanism. It can quickly deploy contents for the group or organization.

For the aforementioned purposes, the invention provides a generalized application virtualization method for business use on the web. Its features include the said Initialization: to obtain parameter and read into setup file, to initialize a DDE (Dynamic Data Exchange) service, to operate application monitor, and to carry on register and login; Access: The client-side SOD (Software On-Demand) controller, logs into access server via access protocol; Selection of content: To input a keyword to select contents, the contents selected are provided according to the content management protocol;

Choosing application virtualization method: Choose one of the application virtualization methods according to bandwidth needed by the user and the resources consumed in the data center; Execution of application virtualization method: Bind the executable software for the application virtualization method and the contents selected, and carry out that executable software; Metering and billing: Calculate the start and end time of execution of application virtualization method and calculate the billing.

The invention also includes a mini server application of the generalized application virtualization method for business use on the web. The mini server includes a client-side SOD controller, which selects application virtualization method according to service level, transmits the contents within the local net or Intranet with this method, and starts to meter time.

In the aforementioned scheme, the said Client Executive (a general term for "client-side SOD controller or client SOD controller") has to be installed by the web user at the client side. The executive controls four kinds of aforementioned steps on the client. (1) The user accesses an access server first; and the access server contains user information for verification. (2) Then when the user selects contents, a billing server will check billing method and bank account funds. If passed, (3) the client SOD controller chooses one application virtualization method, and executes that method. That application content can be immediately transmitted to the client. (4) Billing is done with the metering information and billing method.

The access server contains a database of information of legal individuals and user groups, verifies the user information which is inputted into a database during registration, and decides whether the user has the privilege to get into the leasing platform.

The content server contains hierarchical contents, sequenced, registered, and managed by network operator, thus facilitating the user to choose by keywords or drilldown categories.

The billing server contains the information of starting and ending time of application from the client SOD controller, which calculates the billing according to the billing method chosen by the user. There are different billing methods: by time length, per use, by a defined time period, e.g. by certain semester, by certain price markup in a defined prime-time period.

The said mini server contains contents synchronized with a central application virtualization server. Users authenticated on the web can use these contents on the mini server through a local net or Intranet. Although the invention uses four servers, the first three can be merged depending on program flexibility and hardware performance. The invention provides a generalized method that can be used for billing by the network operator. Based on the selected application virtualization technique, this invention provides a client SOD controller that, allows a user to access, select content, run application with metering and billing, avoids Microsoft product monopoly, and reaches the goal of content leasing.

BRIEF DESCRIPTION OF THE DRAWINGS

Refer to the attached Illustrations. From the detailed description of this invention method, the said purposes, features and advantages of the invention should be obvious for those who are familiar with this technical domain.

DETAIL DESCRIPTION OF THE PREFERRED EMBODIMENT

Figure 1:
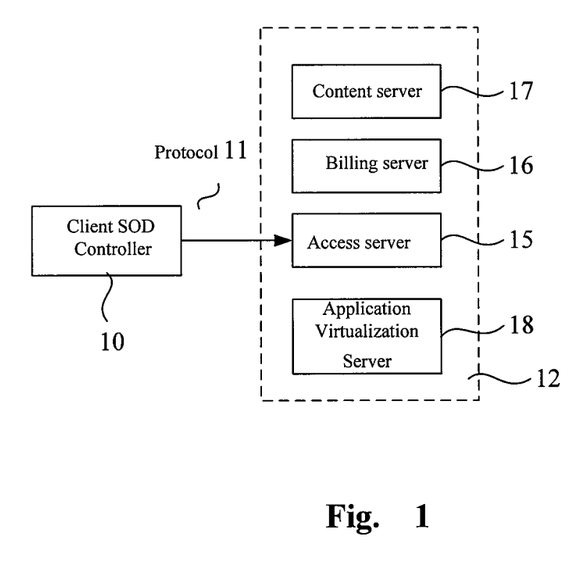
FIG. 1 illustrates one embodiment of a system architecture of the present invention.

In the system shown in FIG. 1, a client SOD controller 10 communicates with a server 12, through a protocol 11. The client SOD controller 10 is for user or user group, through the protocol 11, communicates with the server 12 which includes an access server 15, a billing server 16, a content server 17, and an application virtualization server 18. Correspondingly, the server includes access protocol, executing application (with billing) protocol, the content management protocol, the web transmission protocol, transmission protocol for a local net or Intranet and content FTP protocol. It is appreciated that the protocols for user and user group are the same.

To implement the generalized application virtualization method for business use on web in the said invention, firstly, it is necessary to carry on management tasks of the registration of user's information on various servers, preparation of contents, and activation of charge card etc. Then the user can use the information on web to lease contents. The management tasks are done through a web page by user, or done through management console by the administrator, with a database in the backend to coordinate these tasks. The process to realize these will be introduced in details below.

Figure 2:
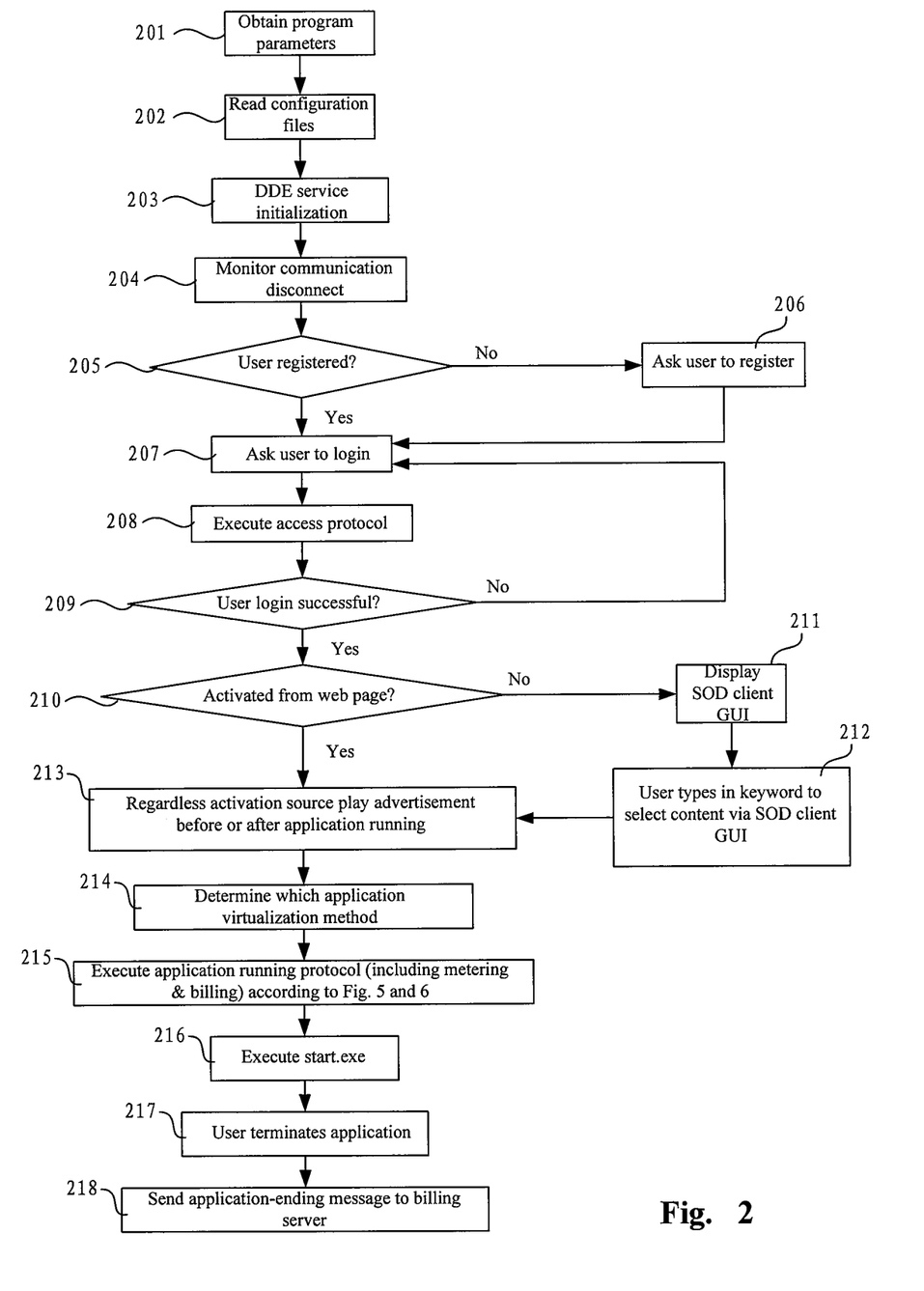
FIG. 2 is a flow chart of one embodiment of the client SOD controller shown in FIG. 1.

FIG. 2 gives the flow chart of SOD client controller 10 and includes:

Step 201, obtain main program parameter. These main program parameters include the code, application name, second-class application name, file extension and control and other parameter etc. The client-side SOD controller 10 on client can be activated through the web page and can be also operated manually by user. The parameters used by these two ways can be different.

Step 202, read setup file, which includes setup information such as the server address and port etc.

Step 203, initialize a DDE service. When user clicks some documents at other websites, if the application generating these documents did not yet stream, with DDE service, the application would automatically stream down to the virtual Q-drive from the SoftGrid server at this time, and start running. Take the SoftGrid of Microsoft as an example. A user clicks a pdf file. If his Acrobat Reader is not installed, the Acrobat would automatically stream down, and open that pdf file.

Step 204, with a monitor, the SOD client controller can determine whether there is communication line dinnection. In addition to basic monitoring of the socket, the monitor has also capability to monitor timeout: Once the line disconnects, it can be detected immediately. As a result, one can apply a relevant billing policy at that moment. For example, one can notify a user about a service pause, until a line reconnection. (1) Monitoring line disconnection, so-called "heartbeat" among IT fields, is an important operation for monitor. At fixed time, the client sends a message to the server and receives response. If it did not receive a response in a certain time, then it, determines for line disconnection or server crash, and vice versa. (2) A line disconnection billing policy for that content did not stream 100%: Whether this time's contents are free for user or to succeed a continuous charge after recovering. (3) A line disconnection billing policy for that content did already stream 100%: One feature of application virtualization method is that usually an application can operate as long as streaming 20%. If line disconnection, it will report error immediately. However, if the content already streams 100% to the client, the fact is that the content can still be used after line disconnection and will not report error; the server however can not get any billing information from the client. Under such circumstance, a different policy is required to decide billing, e.g. to calculate the billing on local client temporarily.

Step 205, determine if a user already completed registration or not. If user has already registered, turn into step 207; otherwise, go to step 206 then can proceed to step 207.

Step 206, if the user did not register and the user is requested to register. The user can get into step 207 after registering.

Step 207, the user is requested to login. The user then can proceed to step 208 after login.

Figure 3:
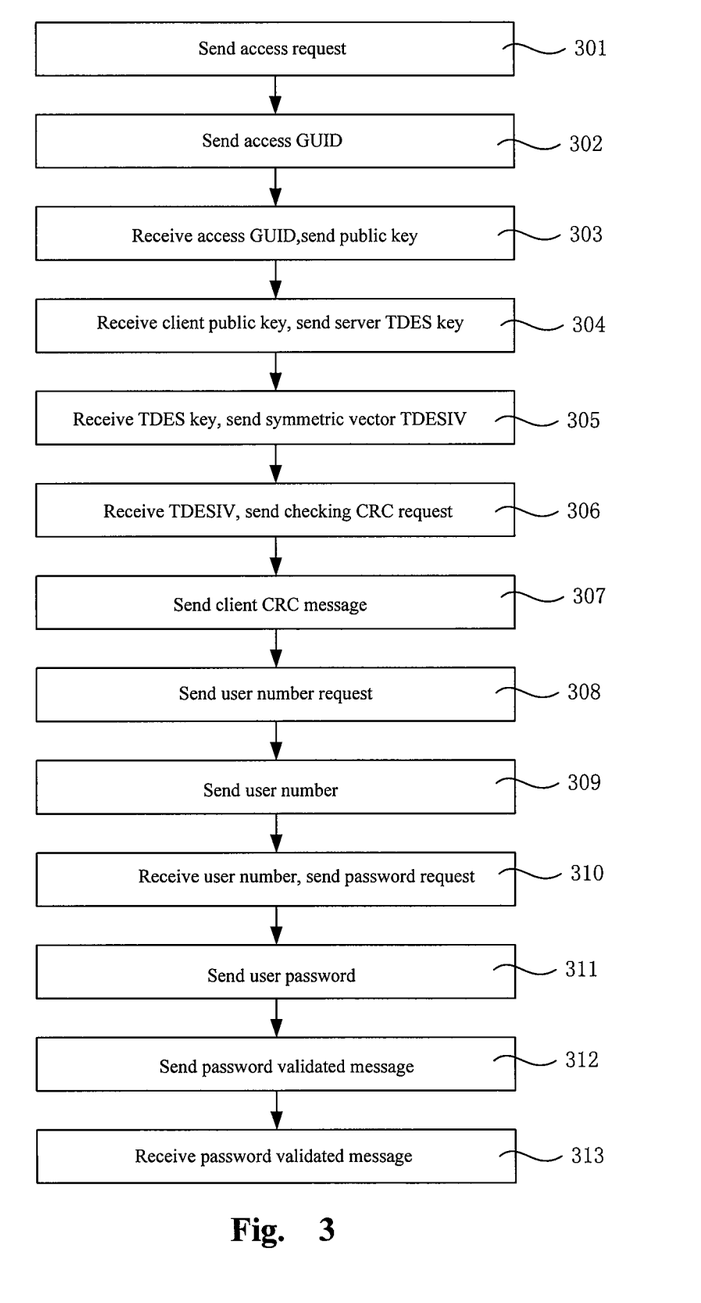
FIG. 3 is a flow chart of one embodiment of step 208 in FIG. 2, in which access and authentication are processed.

Step 208, perform input protocol in FIG. 3.

Step 209, verify whether the user login with password is successful. If successful, proceed to step 210, otherwise return to step 207.

Step 210, determine whether one is activated by the web page. If yes, proceed to step 213, otherwise, has to go to step 211 and 212, then proceed to step 213.

Step 211, display SOD client.

Step 212, after displaying SOD client, the user can immediately select content by inputting keyword into the graphical interface. After preparing by the administrator using content management protocol in FIG. 4, the user can select and use the content. As a common user (rather than an administrator), (s)he uses only step 413 in FIG. 4. In the search results from the content server (steps 414 in FIG. 4), the name and category of contents are returned. This provided step 214 with the dynamic information to make decision.

Step 213, if an advertisement (also a virtualized content) is to be inserted, this insertion must comply with the industry standard of the frequency to display advertisement, or, determine even whether to advertise. Regardless how the application is activated, enacting advertisement is shown before applying or after applying the content.

Step 214, activate an application virtualization method according to the different virtualization platforms. Next, decide to choose which application virtualization method. For example, Microsoft SoftGrid and RTSP protocol pairing is one candidate of several virtualization methods. As a matter of fact, it can be that the application virtualization method candidates are already written in the client software in advance as an optimized selection. This is called static decision. For example, two selected candidates each have their own respective special features in using bandwidth, so at start when the client is installed, the parameters of both candidate methods are already in the setup files (step 202). The dynamic decision in this step is nothing but to differentiate content types: the application virtualization method may provide of different Level of Service, LOS, for different content types. (The LOS is closely related to user's communication bandwidth. The real-time game has to have the highest Level of Service, because no game player can tolerate the runtime delay resulted from a non-100% streaming of game. Movie or music perhaps can have the intermittence, especially those free videos. In general, non-real time business application needs no high bandwidth, because the interaction between user and machine has more delay than the delay caused by communication.) Again from the example above, two candidates of application virtualization methods are setup. The first is Microsoft SoftGrid, of which the RTSP currently used did not have the latest transmission technology. The second application virtualization candidate uses the latest transmission technology, so the real time game completes the streaming in a blink under the common bandwidth. Therefore, if content-type parameter is game, the second application virtualization method will be prepared. However, if the user just watches free movie, then SoftGrid RTSP of the Microsoft can be used to deliver contents. Moreover, the higher the LOS, the more resources of the data center are used. Thus, this step dynamically decides the policy of application virtualization method: the LOS is high and the resource consumed in the data center is little.

Figure 5:
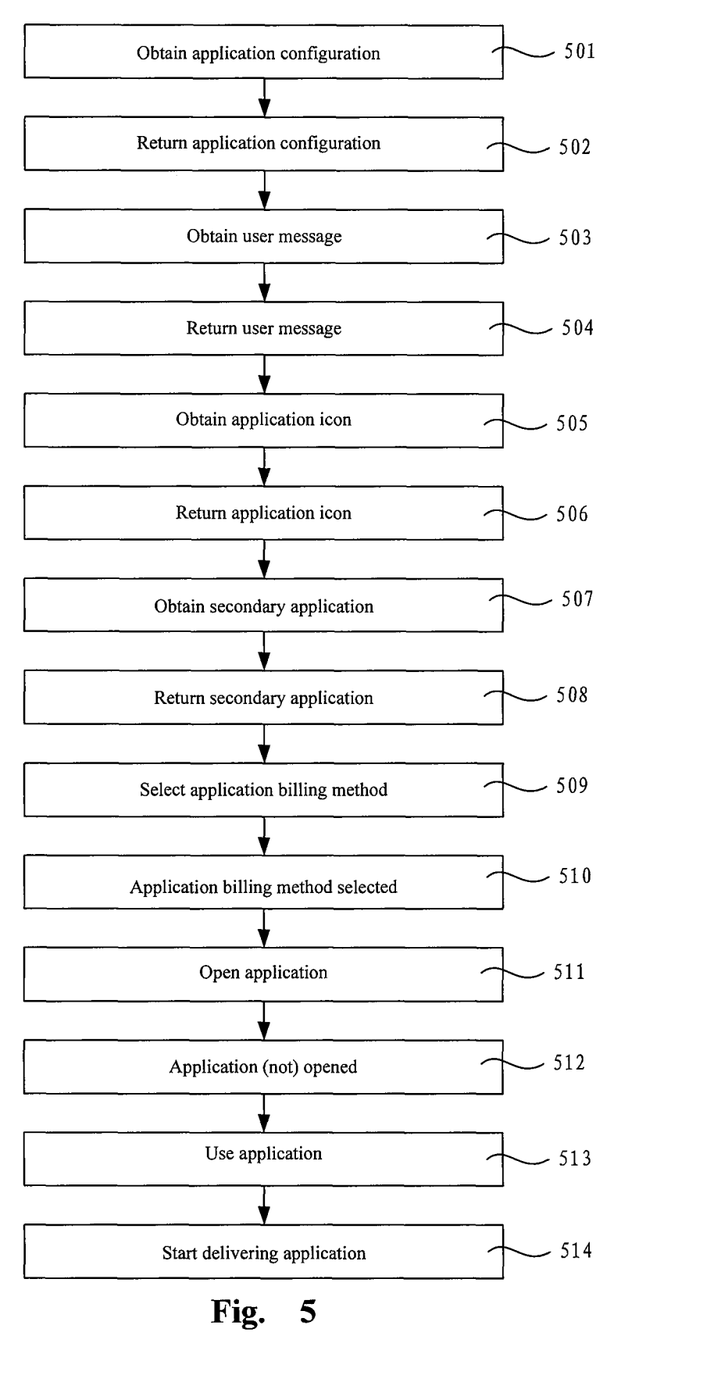
FIG. 5 is a flow chart of step 215 in FIG. 2, which which applications is executed (with metering and billing)

Step 215, execute application protocol (include metering and billing) in the FIG. 5.

Step 216, execute "start.exe". In the process of running start.exe, (1) After sequencing, the necessary formats (i.e. SFT and OSD files) of all types of contents sequences are unified; (2) After the format of all the virtualized contents are set, the virtualized package can be delivered in many ways including streaming, normal downloading, P2P communication, and FTP transfer (first to the mini server then) to the SOD client controller, without worrying about content piracy; (3) Preparing execution parameters, decoding and verifying the virtualized package to be delivered to the user. Application then begins running. (4) If we sequence a game and its companion program, which examines virtual drive game status, together into a virtualized package, the virtualized package can be used by the game player, or used for in-game advertisement when the game changes status. The Start.exe is a special executable program for the said invention, not public software. In fact, this step is the detailed explanation of step 513 "usage application" in the FIG. 5. This step has a core code:

sfttray appName parameterlist

It looks very simple, albeit it has already experienced a lot of preparing actions before going to this step. This means:

The Generalization of the Application Virtualization Method: sfttray is an executable for SoftGrid client, if SOD client decides to use another application virtualization method, according to step 214 dynamic decisions, then the other executable (e.g. the Appstream™ (hereinafter "Appstream") or Citrix™ (hereinafter "Citrix") Tarpon™ (hereinafter "Tarpon") executable in client) will replace sfttray. (The order of sequence for parameter in the parameter list may be different due to different virtualization method.)

The Unification of Different Contents: The appName represents for contents that was prepared. In the content preparation process, in addition to the explanation of the unified management process in the FIG. 4, there is also a virtualization application sequencing process. Regardless they are a game, video or business app, different types of content are unified in sequencing and management process. They can then be delivered uniformly to the client.

The Content Dispersion: Digital supermarket server site is not the only location the contents can reside and deliver from. As long as the selected application virtualization method has an "import" function at the client side, the contents may also be delivered through common download, P2Ps, and through the FTP (first to the mini server and then) to import to the client-side SOD controller at the client side. Therefore, the content residence can be outside of the server site. Of course, a user still needs to go through access protocol for authentication before using the contents, so that there is no worry about that contents being too widely spread and used illegally.

The Prevention of the Illegal Game Plug-in: Because at the client, the game is protected in the virtual (disk) drive, where no plug-in can get into. Therefore, after the game is streamed, the illegal game plug-in can not be installed.

Portability of Game Status File: The gamer plays games in the different places and often needs to take game status file with him or her, in order to continue from the existing status. This is usually what game development company connived. Since the game can't get into the protected virtual drive, the solution is to first write a secondary application that can copy the game status files in the virtual drive to some place outside the drive, then sequence this program together with the game into one virtual package.

In-game advertisement: With the permission and cooperation from the game vendor, one may sequence a game together with a secondary, checking-status-file program into the same virtualized package. Then an advertisement can be shown when the game changes status.

Step 217, the user terminates the running of virtualized application. This step and step 218, in fact, are a summarized statement of detailed steps in FIG. 6. The key point is the billing process at the end of application execution. Please refer to the notes of the detailed steps in FIG. 6.

Step 218, send out information of application-ending to billing server.

The above said process involves three different protocols. Detailed introduction will be given below, with the FIGS. 3-6 respectively.

FIG. 3 gives the processing flowchart between client-side SOD controller (so-called "SOD client controller" or "SOD controller" hereafter) and the access server with a access protocol.

Step 301, first, an access request is sent to the server 12 from SOD controller 10;

Step 302, the server 12 immediately builds a GUID number for the user and to transmit it to the SOD controller 10;

Step 303, the SOD controller 10 sends out a client-side public key to the server 12;

Step 304, the server 12 receives the client-side public key and sends out a TDES key to the SOD controller 10;

Step 305, the SOD controller 10 receives a TDES key and sends out symmetric vector TDESIV to the server 12;

Step 306, the server 12 receives TDESIV and sends out request for checking CRC to the SOD controller 10;

Step 307, the SOD controller 10 sends out client CRC information to the server 12;

Step 308, after checking the CRC, the server 12 sends out user-number request to the SOD controller 10;

Step 309, the SOD controller 10 sends out a user number to the server 12;

Step 310, the server 12 receives user number and sends out a password request to the SOD controller 10;

Step 311, the SOD controller 10 sends out a user password to the server 12;

Step 312, the server 12 sends out the password-verifying information to the SOD controller 10;

Step 313, the SOD controller 10 receives the password-verifying information. If the access is allowed, then the SOD controller 10 sends a notification to the server 12, and the server 12 then establishes that software object; if the access is denied, then no notification is sent to the server 12, but the SOD controller 10 reports a login failure message to the client.

In aforementioned access protocol process, it is not only to verify a password, but also to exchange a secret key. The secret key is not only used in access, but also used in two other protocols for the content management and application execution. The reasons are: (1) such a security mechanism prevents the protocol info being intercepted and billing system destroyed. (2) the metering instruction is independent from the RTSP of (3) the RTSP secure protocol is a RTSPS which is considered unstable when it is used on web.

Figure 4:
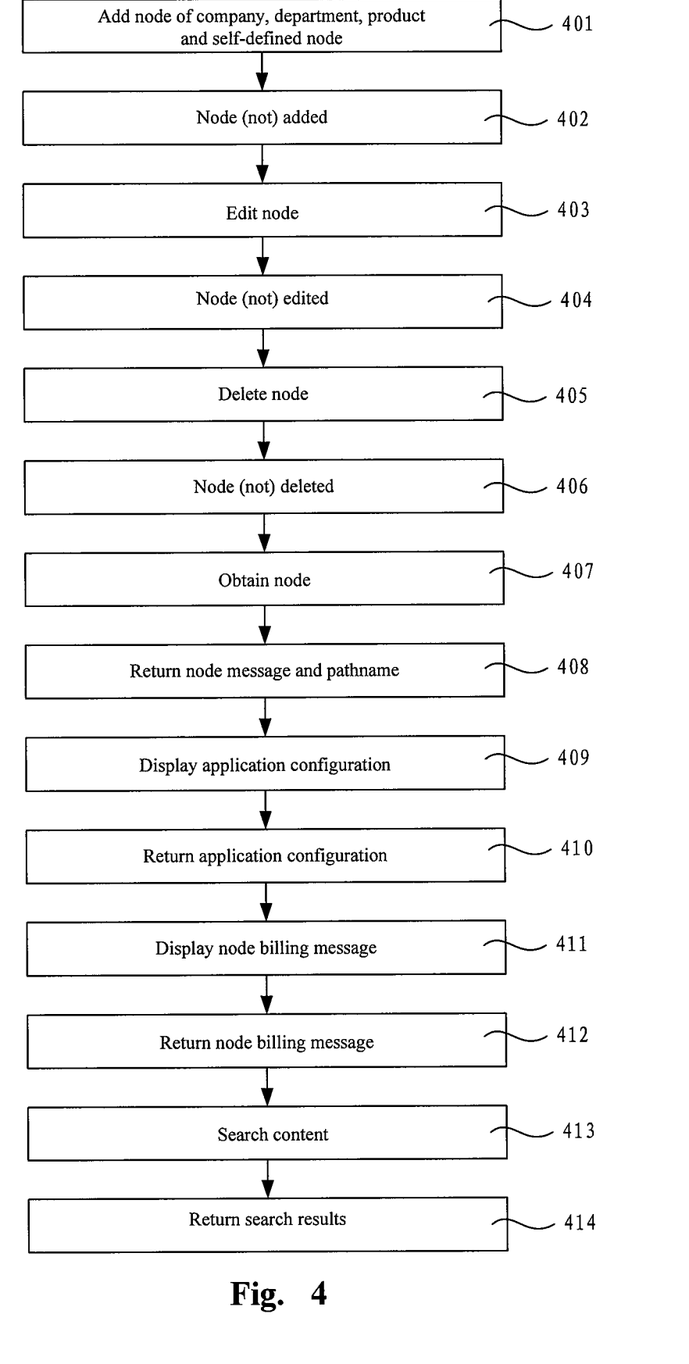
FIG. 4 is a flow chart of step 212 is FIG. 2, in which the contents are selected.

FIG. 4 is the processing flow chart between the SOD controller 10 at the client and content server 17, which performs content management protocol.

Step 401, the SOD controller 10 sends a request to the server 12 to add a company, department, product, and self-defined node;

Step 402, the server 12 builds the node immediately for the administrator and sends the SOD controller 10 the information saying that the node is built up already;

Step 403, the SOD controller 10 sends out to the server 12 an instruction to modify the node;

Step 404, the server 12 modifies that node immediately for the administrator and sends the SOD controller 10 the information saying that the node is modified already;

Step 405, the SOD controller 10 sends out an instruction to the server 12 to delete the node;

Step 406, the server 12 deletes that node immediately for the administrator and sends the SOD controller 10 the information saying that the node is deleted already;

Step 407, the SOD controller 10 send an instruction to the server 12 to obtain the node;

Step 408, the server 12 transmits immediately the information of the node and pathname to the SOD controller 10;

Step 409, the SOD controller 10 sends to the server 12 an instruction of displaying application configuration data;

Step 410, the server 12 delivers immediately to the SOD controller 10 the information of application configuration data;

Step 411, the SOD controller 10 sends to the server 12 the information of displaying node billing;

Step 412, the server 12 transmits immediately to the SOD controller 10 the information of node billing;

Step 413, the SOD controller 10 sends a content search instruction to the server 12;

Step 414, the server 12 transmits search result to the SOD controller 10 immediately.

In the aforementioned step, similarly to a normal user, a content administrator logins, goes through access protocol process, and completes secret key exchange. From here on, each time the SOD controller converses with the content server, the secret key will be used to prevent security breach as a lower-layer communication.

FIG. 5 is the processing flow chart between the SOD controller 10 at the client and the billing server 16, which performs metering and billing protocol.

Step 501, the SOD controller 10 sends to the billing server 16 the instruction to obtain application configuration data;

Step 502, the billing server sends immediately to the SOD controller 10 the information of application configuration, such as content pathname and location on SoftGrid server;

Step 503, the SOD controller 10 sends out an instruction to obtain user information;

Step 504, the billing server sends immediately to the SOD controller 10 the user information of user object built up in server during the operation of access protocol in FIG. 3, in addition to user name and password, the information also includes user contact information provided during registration, for example, sex, email address, cell phone, telephone, address, etc.

Step 505, the SOD controller 10 sends to the billing server 16 the instruction to obtain application icon;

Step 506, the billing server 16 sends immediately to the SOD controller 10 the application icon;

Step 507, in order to process secondary applications related to the main application, e.g. PowerPoint™ (hereinafter "PowerPoint") and Excel™ (hereinafter "Excel") as secondary to package together with Word™ (hereinafter "Word") in Microsoft Office Suite, the SOD controller 10 sends to the server 12 the instruction to obtain secondary applications;

Step 508, the billing server 16 immediately delivers the secondary application names to the SOD controller 10;

Step 509, the SOD controller 10 sends out to the billing server 16 the instruction of choosing application billing method and signing contract; first, the SOD controller 10 determines what billing method is used by that user, to pay first and use after or to use first and pay after.

Step 510, the billing server 16 sets the application billing method selected by that user and notifies the SOD controller 10 setting completed;

Step 511, the SOD controller 10 sends out to the billing server 16 an instruction to open application;

Step 512, the billing server 16 immediately puts that application into the user object, and notifies the SOD controller 10 that an application has already opened;

Next step 513, the SOD controller 10 commands that the content be delivered according to the virtualization method chosen by the user in step 214 of FIG. 2. For example, if Microsoft SoftGrid and RTSP protocol are selected, through SoftGrid client 52 one may ask the SoftGrid server 12 to send application contents. The SOD controller 10 starts to meter at this time;

Step 514, the SoftGrid server 12 delivers application to a SoftGrid user through RTSP protocol. This is a major function of the Microsoft product SoftGrid.

In summary, what FIG. 5 essentially completed is the first-half, preparation task for metering and billing.

Figure 6:
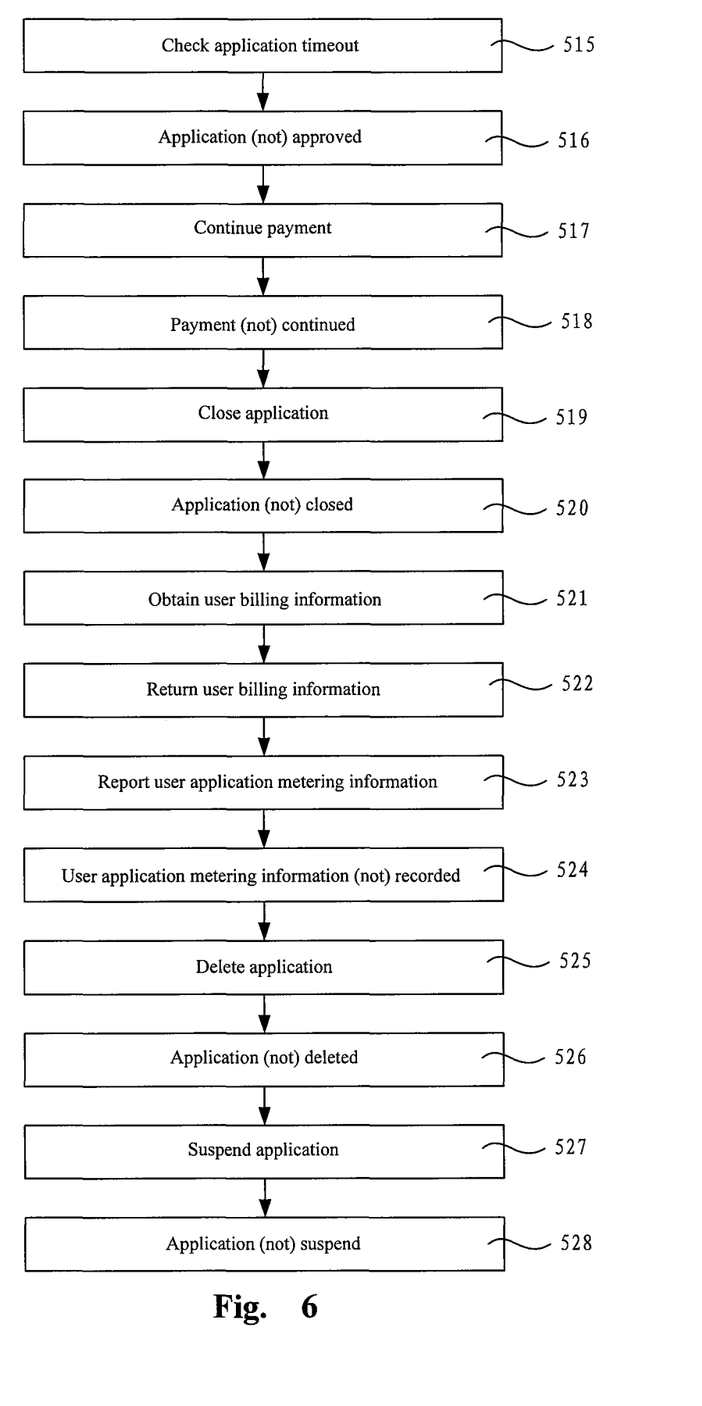
FIG. 6 is a flow chart of steps 217 and 218 in FIG. 2, in which application is executed (with metering and billing)

FIG. 6, as a second-half task, metering is completed through timeout detection.

In the step 509, the SOD controller 10 has already determined which billing method is adopted by user, pay after use or pay then to use.

Step 515, the SOD controller 10 sends to the billing server 16 an instruction to verify if the usage of application is timed out according to the application billing rule and start time;

Step 516, the billing server 16 immediately transmits the verification result to the SOD controller 10. If the user's billing method is use-after-pay and the fund is insufficient, the SOD controller 10 can forbid a user to continue to use at the client side. At this time, if the user decides to continue to pay, the SOD controller 10, with the step 517, sends to the billing server the instruction of continued payment;

Step 518, the billing server 16 checks immediately the user's account and transmits; to the SOD controller 10 the result of setting the continued payment;

When the user completes the contents application, the SOD controller 10 performs step 519. The SOD controller 10 stops metering and sends to the billing server 16 an instruction to close application;

Step 520, the billing server 16 immediately transmits the result of closing application to the SOD controller 10;

Step 521, the SOD controller 10 sends to the billing server 16 an instruction to obtain user product billing information;

Step 522, the billing server 16 delivers immediately the user's product billing information to the SOD controller 10, in order to calculate expenses;

Step 523, the SOD controller 10 sends to the billing server 16 an instruction to report user's application information, including total usage time and total expenses;

Step 524, the billing server 16 immediately records usage time and total expenses information reported by the user into the database, and notifies the result to the SOD controller 10.

At any time, the user can send to the billing server 16 an instruction of deleting application with instruction 525;

Step 526, the billing server 16 immediately deletes the application from the user's object, and notifies the SOD controller 10 that an application already is deleted;

Likewise, the user can also send to the billing server 16 an instruction to suspend application at any time with a step 527;

Step 528, the billing server 16 immediately suspends that application in the user's object, and notifies the SOD controller 10 that an application is already suspended.

Figure 7:
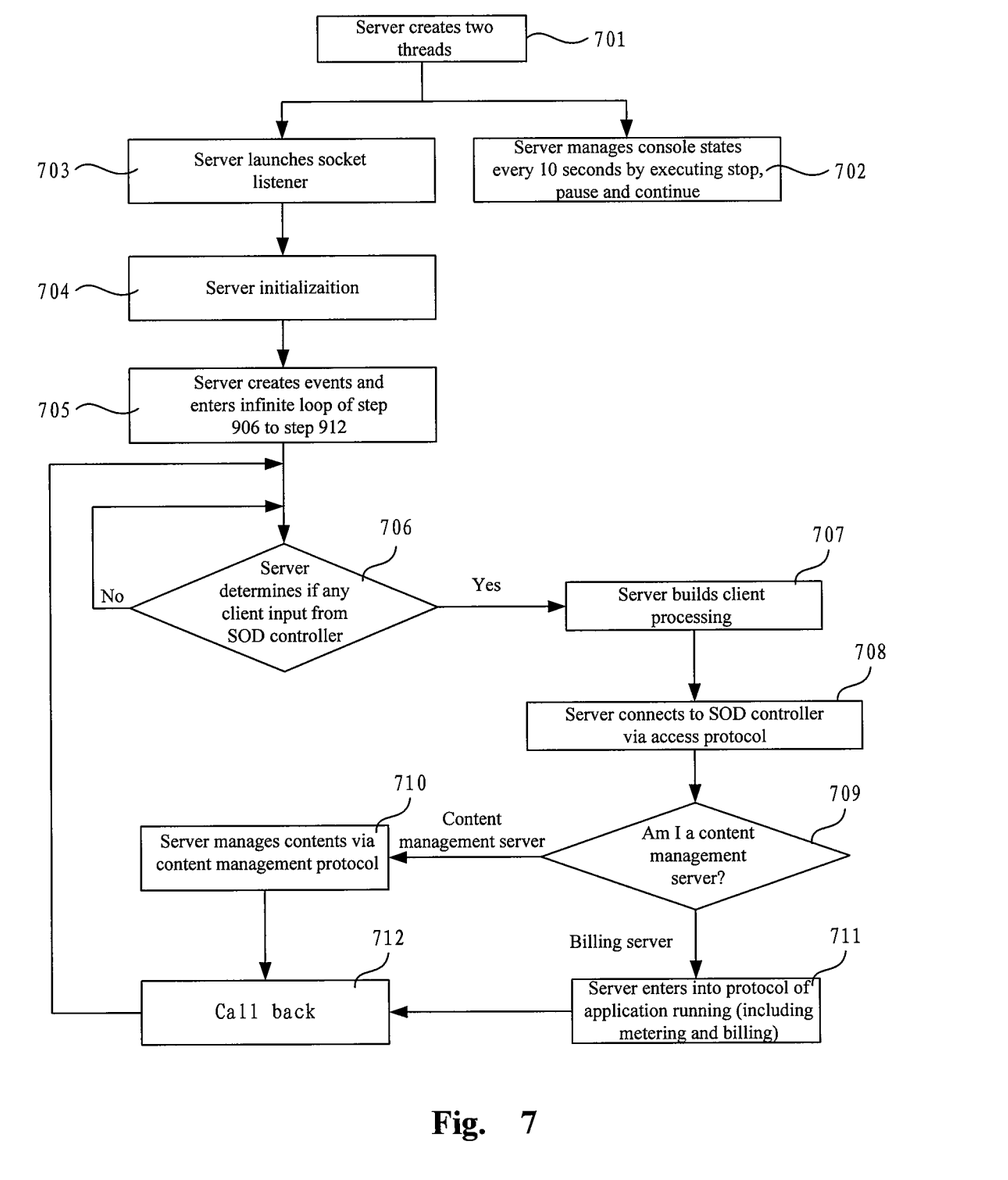
FIG. 7 is a flow chart of the content server and the billing server of the invention.

What to be explained is the flow charts in FIGS. 3-6 are modified Figures from the so-called "communication protocol Figures" as commonly known in the engineering community. The steps shown in the modified Figures can be regarded as exemplary steps, rather than mandatory steps. Furthermore, the steps of odd numbers can be the requests that the SOD controller 10 at the client sends to the server 12; the steps of even numbers can be the responses that the server 12 delivers to the SOD controller 10 at client. FIG. 7 is the flowchart figure of the billing server 16 or content server 17 in response to said billing or content management process. The software structures of the two servers 16,17 are very similar, except in the step 710 with 711, where the communication protocol to SOD controller 10 is different. As to the specific billing protocol and content management protocol, the descriptions are referred to in the aforementioned FIGS. 4-6. Step 701, two threads are spawned by the server 12, the first thread is executed in step 702, and the second thread is executed in step 703 and the steps after step 703.

Step 702, the server 12 carries out stop, pause, or continue commands every 10 seconds according to the management console status. Management console is the managing software of the server 12. It is used for insuring the load balance and fault tolerance of the server 12;

Step 703, the server 12 starts a socket monitor and monitors whether the client crashes and whether there is anything transmitted in;

Step 704, the server 12 performs the initialization of the service information;

Step 705, the server 12 establishes "events" and also gets into the steps 706-712 of an infinite loop;

Step 706, the server 12 determines whether there is any input from the client (i.e. the SOD controller 10) or not. If yes, perform step 707. Otherwise, continue to wait;

Step 707, the server 12 builds up client processing software component;

Step 708, the server 12 connects client SOD controller 10 through the access protocol with the security key in the database;

Step 709, the server 12 checks to see if it itself is the content server 17. If yes, then perform step 710. Otherwise it is the billing server 16, execute step 711.

Step 710, the server 17 manages the content according to the content management protocol shown in FIG. 4. There is the information of each node in the database.

Step 711, the server 16 proceeds application running (include metering and billing) protocol in the FIGS. 5 and 6.

When either of step 710 or 711 completes the protocol instruction, the server 12 performs step 712.

Step 712, the server 12 uses "callback" to handle events. Possible events are: error in sending, error in receiving, error when establishing user, successful login, server socket closeout, service denial, server pause, and server stop. When the events finish handling, the server 12 probably returns to step 706, or terminates server operation according to the seriousness of the situation.

Figure 8:
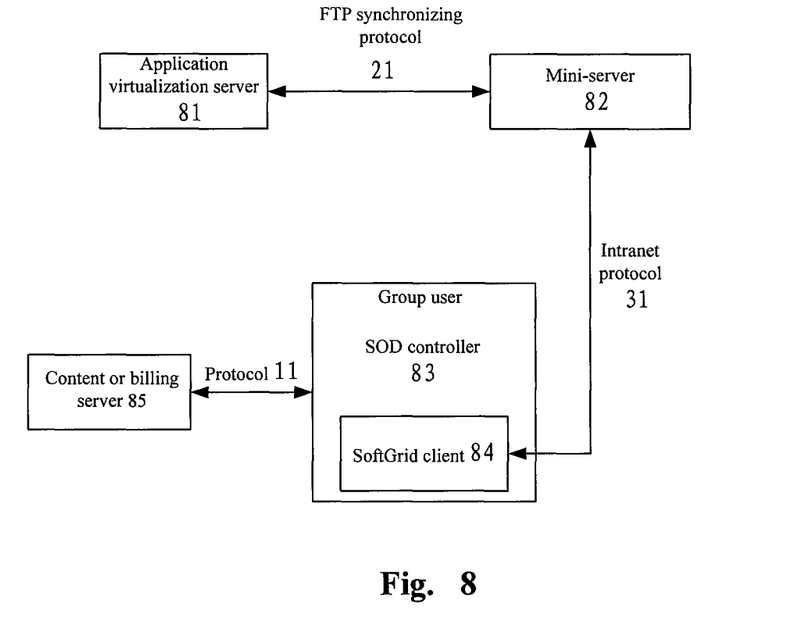
FIG. 8 is one embodiment of an application example of a mini server.

FIG. 8 shows one embodiment of a mini server 82 which runs the process shown in FIG. 2. A client SOD controller 83 is used by a group of users rather than an individual user. The FTP synchronous protocol 21 is used between the application virtualization server 81 and the mini server 82. A local net or Intranet protocol 31 is used between the SoftGrid client 84 and the mini server 82. Both of the FTP synchronous protocol 21 and the local net or Intranet protocol 31 may adopt the international standard protocols. As for the content or billing protocol 11 between the client SOD controller 83 and the content server or billing server 85, it is described in detail in FIGS. 3-6 respectively. Although in the above description, we use the Microsoft product SoftGrid as an example, a different virtualization method can replace SoftGrid, whichever application virtualization product is selected by the user. The only thing is: the selected product has to have the "import" function. It is necessary to explain: the "import" function is one of the characteristics of the Microsoft product SoftGrid. "Import" means that the virtualized application need not go through streaming. What is needed is to "add" the OSD file resulted from sequencing to the client, and then, "import" the SFT file to the client.

Refer to FIG. 8, the application virtualization server 81, with FTP synchronous protocol 21, sends the content file synchronizing requests to the mini server 82 (as a buffering child server) in the user group;

Afterwards, the mini server 82, with the FTP synchronous protocol 21, completes the content file transmission. Thereafter, when the group user accesses the content server or billing server 85, it chooses content and opened application according to the content protocol or billing protocol 11;

At this time, the SOD controller 83 sends the request of "importing" the content file to the mini server 82. Then, the mini server 82, using the local net or Intranet protocol 31 (e.g. local Ethernet transmission protocol), sends the content file to the SoftGrid client 84. This completes the "import" function of the SoftGrid and starts application running. Afterwards, the client SOD controller 83 closes application and completes metering and billing function as shown in FIG. 6.

In the real networking environment, it is entirely possible to combine the function of the content server 17 into the billing server 16 in one physical machine. Similarly, this applies to the logics of the content server 17 into the billing server 16. In regards to the said logics of access server into the contents management server. In regards to the said invention: this kind of combination can apply to both situations of individual user and the group user, so that the access/authentication process can proceed in two separate physical machines (i.e. billing server 16 and content server 17).

According to the description of aforementioned process, a leasing platform of leasing digital contents is provided to an individual user, whereby a network operator needs not use the Active Directory of Microsoft on the web. By providing a metering method that is independent of Microsoft streaming protocol, a user billing is not constrained by a single application virtualization technique. Furthermore, the leasing platform provides a dynamic advertisement option, prevents illegal game plug-in, and read game status files from a virtual drive in the client. Meanwhile, the user has the ability to choose from many contents. The content server 17 can also use a tree structure to collect and manage a vast amount of contents. For a group of users, because of usage of the Intranet transmission, an application-running process is accelerated. Also, services can be provided for multiple groups from a single server. These services include centralized content management, and quick, on-demand deployment across geographically-spread regions.

In summary, the said invention combines application virtualization technique, web communication technique, and application computer technique. It provides a digital content leasing method for the individual and group users of public web.

Any technical personnel can use the said invention with the description of better-applied examples given above. The various modifications of these examples are obvious to the technical personnel in this field and the basic principle can be applied to the other examples without extra creation. As a result, the said invention won't limit the shown practical examples here, but should include most extended scope according to the principle and the new characteristics revealed here.

The invention claimed is:

1. A web-based generalized application virtualization method for leasing digital contents selected by a subscriber on a network through a client-server delivery system, the digital contents including data related to a primary application, a plurality of secondary applications, and delivered content data associated with the primary application, the method comprising:
    performing a pre-logging procedure including performing a plurality of pre-logging steps, at least some pre-logging steps of the plurality of pre-logging steps causing communication over the network, the network being accessible from a client device, including obtaining a plurality of parameters, reading a setup file, initializing a data exchange service, monitoring communication activities, and carrying out subscriber registration;
    performing an access protocol for the subscriber to log into an access server via an access protocol between a client SOD (Software on-Demand) controller and the access server;
    detecting selection of the digital contents via the client device using a keyword input by the subscriber, according to a content management protocol between the client SOD controller and a content server;
    choosing, via the client device, an application virtualization technique of a plurality of application virtualization techniques stored on the client device by the client SOD controller according to bandwidth needed by the subscriber and resources consumed in a data center on the network;
    executing, via the client SOD controller, executable code of the chosen application virtualization technique at the client device, and thereby initiating a transfer of the primary application to the client device and, upon completion of the transfer of the primary application to the client device, running the primary application on the client device using the chosen application virtualization technique, wherein the primary application is executed via the chosen application virtualization technique without modification of an operating system of the client device by installation of the primary application; and real-time metering start and end time of running the primary application and calculating billing according to a billing protocol between the client SOD controller and a billing server, wherein the client SOD controller executes software on-demand.

2. The method of claim 1, wherein the real-time metering and calculating billing steps comprise:

acquiring application configuration information, subscriber information, application icon information, and selecting a billing method by the client SOD controller;

starting content delivery according to the application virtualization technique by the client SOD controller, and starting to count time for billing;

tracking timeout situation according to the billing method; and ending the content delivery by the client SOD controller, and metering time length and cost by the billing server.

3. The method of claim 2, wherein the calculating billing method comprises: a method of pay-first-then-use or a method of use-first-then-pay, real-time metering method of the calculating billing method is based on at least one of: time length, use, time period, semester, and prime-time price-markup.

4. The method of claim 1, wherein the monitoring communication activities further comprises:

setting up a plurality of billing policies for the digital contents being streamed completely and for the digital contents being streamed incompletely with respect to a line disconnection situation;

wherein a disconnection billing policy includes two cases: in case of the digital contents are streamed incompletely, the digital contents are used for free if disconnection occurs, or is continued to charge after reconnection; and in case of the digital contents being streamed completely, the digital contents can still be used at the client device, then no error is reported during the line disconnection situation.

5. The method of claim 1, wherein the billing protocol includes activating one of the plurality of secondary applications to calculate billing for at least one of a plurality of services including: status file transfer, in-game advertisement, associated application streaming, and prevention of illegal game plug-in.

6. The method of claim 1, wherein transfer of the primary application to the client device includes: transferring the selected digital contents using one or more of streaming, downloading, peer-to-peer communication, or file-transfer-protocol transfer.

7. The method of claim 1, wherein the primary application is a game, one of the secondary applications is further used to play an in-game advertisement; and wherein the executing, via the client SOD controller, the executable code of the application virtualization technique at the client device, and thereby starting to transfer the primary application to the client device and run the primary application on the client device includes providing services based on automatically streaming one of the plurality of secondary applications and further includes: streaming the primary application, and automatically streaming the one of the plurality of secondary applications to play an in-game advertisement when running the primary application.

8. The method of claim 1, further comprising: sequencing all types of contents, including sequencing of the primary application and the plurality of secondary applications to unify to a format.

9. The method of claim 1, wherein executing, via the client SOD controller, the executable code of the application virtualization technique at the client device, and thereby starting to transfer the primary application to the client device and run the primary application on the client device includes at least one of:

streaming the primary application with the delivered content data and playing the delivered content data; and streaming the primary application and the plurality of secondary applications, wherein one of the plurality of secondary applications provides a status-file transfer service.

10. A mini-server system for implementing a web-based generalized application virtualization method for leasing digital contents selected by a subscriber on a network, the digital contents including data related to a primary application, a plurality of secondary applications, and delivered content data associated with the primary application, the mini-server system comprising:

a mini-server, a content server, an access server, a billing server, and a client device, wherein a client SOD (software on-demand) controller executing at the client device and configured to perform a pre-logging procedure including performing a plurality of pre-logging steps, at least some pre-logging steps of the plurality of pre-logging steps causing communication over the network, the network being accessible from the client device, the pre-logging steps including: obtaining a plurality of parameters, reading a setup file, initializing a data exchange service, monitoring communication activities, and carrying out subscriber registration;

the access server has an access protocol between the client SOD controller and the access server for the subscriber to login; and the content server selects the digital contents by a subscriber inputting a keyword via a computer, according to a content management protocol between the client SOD controller and the content server, wherein the client SOD controller chooses an application virtualization technique of a plurality of application virtualization techniques stored on the client device according to bandwidth needed by the subscriber and resources consumed in a data center on the web;

the client SOD controller via the client device executes executable code of the chosen application virtualization technique at the client device, and thereby initiates a transfer of the primary application to the client device and, upon completion of the transfer of the primary application to the client device, runs the primary application on the client device, wherein the primary application is executed using the chosen application virtualization technique without modification of an operating system of the client device by installation of the primary application; and the billing server meters in real-time start and end time of running the primary application and calculates billing according to a billing protocol between the client SOD controller and the billing server via a computer, wherein the client SOD controller executes software on-demand.

11. The mini-server of claim 10, wherein the digital contents on the mini-server are synchronized with respective contents on a central application virtualization server, and the digital contents are accessible via a local net after an authentication is completed.

12. The mini-server of claim 10, wherein the execution by the client SOD controller of the executable code of the application virtualization technique at the client device, and thereby starting to transfer the primary application to the client device and run the primary application on the client device includes at least one of:
    streaming the primary application with the delivered content data and play the delivered content data; and
    stream the primary application and the plurality of secondary applications, wherein one of the plurality of secondary applications provides a status-file transfer service.

13. An application virtualization method for leasing digital content to subscribers, the system comprising:
    executing a software-on-demand controller on a client device, the software-on-demand controller being configured to execute an application virtualization technique on the client device;
    receiving a selection of digital content at the client device;
    selecting, using the software-on-demand controller, a first application virtualization technique from a plurality of application virtualization techniques associated with the client device, the selection being based on a bandwidth required for accessing the digital content and resources consumed in a data center serving the digital content;
    executing the first application virtualization technique at the client device using the software-on-demand controller, the executing including:
    receiving at least some of the digital content at the client device;
    executing an application associated with the digital content using the first application virtualization technique to access the at least some of the digital content, and
    monitoring a time duration of use of the application associated with the digital content; and
    determining billing information based on the time duration.

14. A web-based generalized application virtualization method for leasing application software selected by a subscriber on a network through a client-server delivery system (CSDS), comprising
    a pre-processing sequencer, at the server-side of the CSDS, virtualizing a primary application, a plurality of secondary applications, and application data associated with the primary application to form a virtualized leasable software application (VLSA) and placing said VLSA on an application virtualization server,
    a plurality of application virtualization platforms (AVPs), at the client-side of the CSDS, being preinstalled on an operating system of said subscriber's client device, needing no software modification for said AVPs to reside any VLSA, and allowing a transfer of a VLSA to the subscriber's client device from said application virtualization server, wherein said VLSA, residing and running at the client device immediately after the transfer, needs no installation, disturbs no operating system registry, and changes no operating system file at the client device,
    a software-on-demand software controller (client SOD controller), at the client-side of the CSDS, being pre-installed on an operating system of said subscriber's client device to control the running of said AVPs, comprising:
    performing a pre-logging procedure including performing a plurality of pre-logging steps, at least some pre-logging steps of the plurality of pre-logging steps causing communication over the network, the network being accessible from a client device;
    obtaining a plurality of parameters, reading a setup file, initializing a data exchange service, monitoring communication activities, and carrying out subscriber registration;
    performing an access protocol for the subscriber to log into an access server via an access protocol between said client SOD controller and the access server;
    detecting selection of the primary application via the client device using a keyword input by the subscriber, according to a content management protocol between said client SOD controller and a content server;
    choosing, by said client SOD controller at the client device, an AVP from the plurality of AVPs, according to bandwidth needed by the subscriber and resources consumed in a data center on the network;
    executing, via said client SOD controller, executable code of the chosen AVP at the client device, and thereby initiating a transfer of the VLSA to the client device and, upon completion of the transfer of the VLSA to the client device, running the primary application of the VLSA not being installed but residing on the client device using the chosen AVP;
    detecting the end time of running the primary application of the VLSA when said subscriber terminates the primary application of the VLSA; and
    metering, in real-time, start and end time of running the primary application of the VLSA and calculating billing according to a billing protocol between the client SOD controller and a billing server,
    wherein the client SOD controller executes software on-demand.

* * * * *